Patented Mar. 15, 1949

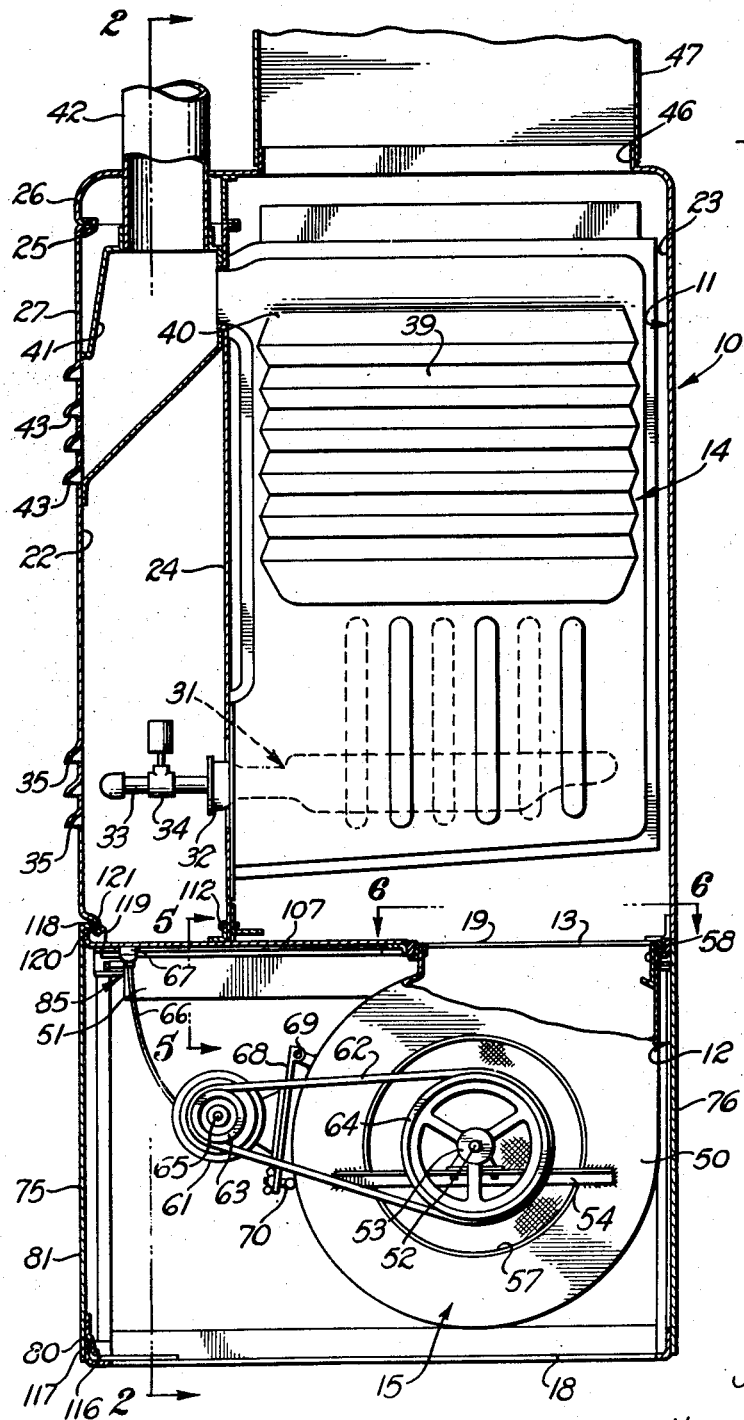

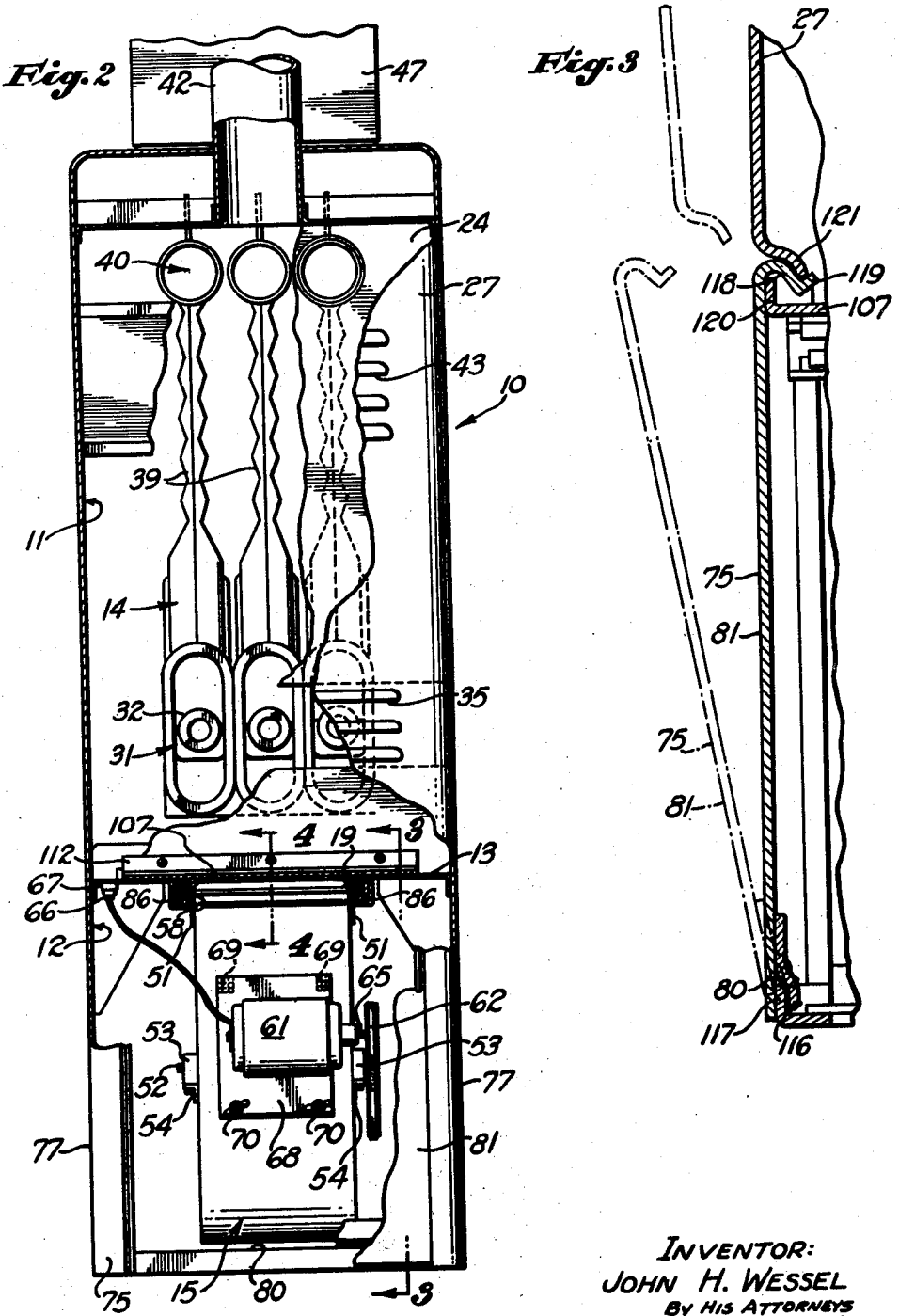

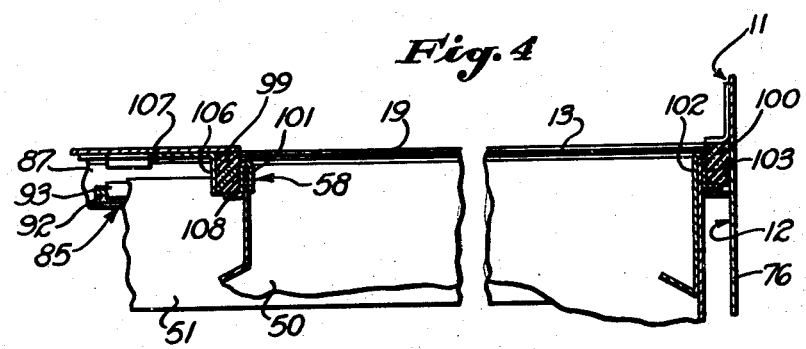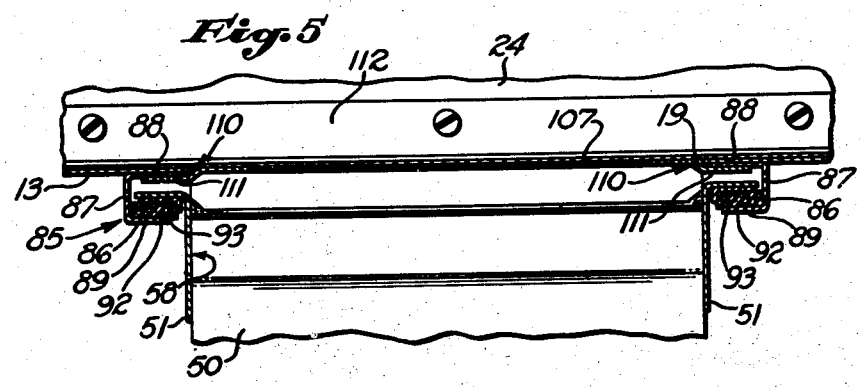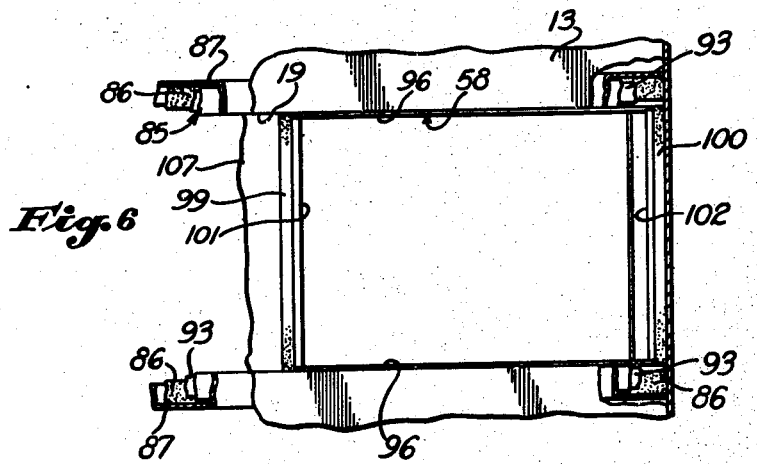

2,464,473

UNITED STATES PATENT OFFICE 2,464,473

BLOWER INSTALLATION

John H. Wessel, Los Angeles, Calif., assignor to Utility Appliance Corp., Los Angeles, Calif., a corporation of California Application April 28, 1947, Serial No. 744,507

13 Claims. (Cl. 230—235)

1

My invention relates in general to blower installations and, more specifically, to a blower mounting system, a primary object of the invention being to provide a resilient blower mounting system which permits ready removal and/or installation of a blower assembly carried thereby.

The fundamental principles of my invention are particularly applicable to a blower installation of the foregoing general character wherein the air delivered by the blower is supplied to a heating installation or furnace, and I prefer to consider such an application of the invention herein for convenience in effecting a disclosure thereof. It will be understood, however, that the blower installation may be employed for other purposes and, consequently, I do not desire to be limited to the particular application of the invention considered herein.

In general, when employing my blower installation in connection with a heater or furnace, I prefer to provide a housing having upper and lower sections or compartments which are separated by a substantially horizontal dividing wall or partition. A suitable heating unit is preferably located in the upper housing compartment and the blower installation is preferably located in the lower housing compartment, the dividing wall having an opening therein through which air delivered by the blower installation is supplied to the heating unit to be heated thereby.

In accordance with the aforesaid primary object of my invention, I prefer to provide a blower assembly which comprises a blower or impeller case, an impeller, and a driving motor, and which may be installed in or removed from the housing compartment therefor as a unit.

More specifically, an object of my invention is to provide an installation wherein the blower assembly is mounted on suitable track means including tracks which support the blower assembly in a positive manner while permitting ready installation and removal thereof. An important object in this connection is to provide a blower installation wherein the blower assembly is suspended from the tracks, the latter preferably being supported by the partition separating the upper and lower housing compartments.

Another important object of my invention is to provide tracks for the blower assembly which include cushioning means for separating the blower assembly from the supporting partition between the housing compartments so as to reduce transmission of any vibration of the blower assembly to the housing structure.

Another object of my invention is to provide a

2 blower installation of the foregoing general character wherein the tracks for the blower assembly are adapted to guide the assembly into an operating position in which the blower outlet registers with the aforesaid opening in the supporting partition or wall so that the air delivered by the blower is supplied directly to the heating unit. An important object of my invention in this connection is to provide means for automatically sealing the blower outlet with respect to the housing structure when the blower assembly has been guided into its operating position by means of the tracks so as to substantially prevent leakage of air delivered by the blower into the lower housing compartment.

Still another object of my invention is to provide a blower installation wherein the aforesaid cushioning means seals portions of the blower outlet with respect to the supporting partition in addition to reducing the transmission of vibration from the blower assembly to the housing structure. Thus, the cushioning means serves the dual function of providing a partial seal for the blower outlet, and of providing a shock-absorbing support for the blower assembly, which is an important feature of the invention.

A further object of my invention is to provide means for completing the partial seal provided by the cushioning means when the blower assembly is in its aforesaid operating position, including means for sealing the remaining portions of the blower outlet with respect to a side wall of the housing and with respect to a removable retaining member or bulkhead member in order to complete the seal of the outlet with respect to the housing structure. An important object in this connection is to provide a blower installation wherein the bulkhead member is adapted to retain the blower assembly in its operating position and is readily removable to permit removal of the blower assembly.

An additional object of the invention is to provide an installation of the foregoing nature wherein the housing compartment for the blower assembly is provided with a readily removable panel covering an opening through which the blower assembly may be installed or removed by moving the blower assembly into or out of the housing along the tracks therefor, a related object being to provide such a panel which is adapted for locked engagement with the housing structure and with the aforesaid bulkhead member in such a manner as to secure the panel while permitting ready removal and installation thereof. Another object in this connection is to provide the housing compartment for the heating unit with a ready removable access panel which is adapted for locked engagement with the panel enclosing the housing compartment for the blower assembly so as to assist in securing the latter panel to the housing structure.

Other objects of my invention include the provision of a blower installation which provides a positive support for the blower assembly while permitting ready installation and removal thereof, which is of simple construction, and which may be manufactured and assembled readily.

The foregoing objects of my invention and the advantages suggested thereby, together with various other objects and advantages which will be evident hereinafter, may be realized by means of the exemplary embodiment which is illustrated in the accompanying drawings, and which is described in detail hereinafter.

Referring to the drawings:

Fig. 1 is a vertical sectional view illustrating a heating installation or furnace which incorporates a blower installation embodying the fundamental principles of my invention;

Fig. 2 is another vertical sectional view of the heating installation and is taken along the broken line 2—2 of Fig. 1;

Figs. 3 and 4 are enlarged, fragmentary sectional views which illustrate various details of the blower installation and which are taken along the broken lines 3—3 and 4—4, respectively, of Fig. 2; and Figs. 5 and 6 are enlarged, fragmentary sectional views which are taken along the broken lines 5—5 and 6—6, respectively, of Fig. 1.

Referring to the drawings and particularly to Figs. 1 and 2 in the particular construction illustrated therein, the furnace incorporating my blower installation includes a housing which is indicated generally by the numeral 10 and which includes two housing sections or compartments 11 and 12 separated by a horizontal dividing partition or wall 13, a heating unit 14 being mounted in the upper housing section 11 in any suitable manner, and a blower assembly 15 being mounted in the lower housing section 12 in a manner to be described in detail hereinafter. Air to be heated is supplied to the blower assembly 15 through an inlet opening 18, shown as located at the bottom of the lower housing section 12, and is delivered directly to the heating unit 14 through a portion of an elongated opening or slot 19 in the dividing wall 13 which preferably extends the full length of the dividing wall as will be discussed in more detail hereinafter.

The heating unit 14 and the manner in which it is installed in the upper housing section 11 per se form no part of the present invention and will not be described in detail. In general, the upper housing section 11 is separated into two compartments 22 and 23 by a vertical dividing wall 24, the front compartment 22 being accessible through an opening 25 in the front wall 26 of the housing 10 which is normally closed by a removable panel or panel member 27.

The heating unit 14 is mounted in the rear compartment 23 of the upper housing section 11 in any suitable manner and includes a multiple burner unit 31, the inlet end 32 of which extends through the dividing wall 24 into the front compartment 22. Fuel, which may be of a gaseous nature, is delivered to the multiple burner unit 31 through supply lines 33, only one of which is shown in Fig. 1, flow through each of the supply lines being regulated by a valve 34 which may be controlled in any suitable manner. Air for combustion of the fuel is drawn into the burner unit 31 from the front compartment 22 of the upper housing section 11 and is mixed with the fuel in the burner unit in the usual manner, the combustion air preferably being admitted into the front compartment through louvres 35, or the like, in the removable panel 27.

As best shown in Fig. 2, a plurality of flues 39 extend upwardly from the burner unit 31 to an exhaust manifold 40, the walls of the flues preferably being corrugated to increase the rate of heat transfer therethrough as is well known in the art. The products of combustion thus flow upwardly from the burner unit 31 through the flues 39 and into the exhaust manifold 40, the exhaust manifold communicating with a chamber 41 which leads to an outlet flue 42 as best shown in Fig. 1. The chamber 41 is ventilated by means of louvres 43, or the like, in the removable panel 27 to provide a means of escape for the products of combustion should a down draft in the outlet flue 42 occur.

Considering the general operation of the heating unit 14, the air to be heated which is delivered by the blower assembly 15 enters the rear compartment 23 of the upper housing section 11 through the opening 19 in the horizontal partition 13 and passes upwardly in the rear compartment between and/or around the flues 39 so that it is heated by the products of combustion flowing through the flues. The air which has been heated in this manner then flows out of the rear compartment 23 of the upper housing section 11 through an opening 46 therein into a conduit 47 which may form part of a suitable distribution system (not shown) for conducting the heated air to points where it is to be used.

Considering the blower assembly 15 in detail, this assembly includes an impeller case or blower case 50 which is carried by a pair of spaced, parallel supporting members or hanger members 51, the entire blower assembly being suspended from and supported by the horizontal dividing wall 13 by means of the hanger members in a manner to be described in more detail hereinafter. An impeller or blower (not specifically shown) is disposed in the blower case 50 in the usual manner and is mounted on a shaft 52, the shaft being journaled in bearings 53 which are carried by structural members 54 suitably secured to the blower case. The impeller is adapted to draw air into the blower case 50 through inlet openings 57 on opposite sides of the case, only one such inlet opening being shown in Fig. 1, and is adapted to deliver the air under pressure through an outlet opening 58 in the case which registers with a rearward portion of the opening 19 in the partition 13 when the blower assembly 15 is in its operating position as shown in Fig. 1.

The impeller is driven by a suitable electric motor 61 through the medium of a belt 62, or the like, which is trained over a driving pulley 63 and a driven pulley 64, the driving pulley being suitably secured to the motor shaft 65 and the driven pulley being suitably secured to the impeller shaft 52. The motor 61 may be connected to a current source by a plug 66 inserted in a receptacle 67 and is preferably mounted on a base 68 which is pivotally connected to the blower case 50 as indicated at 69, the position of the base being variable by means of adjusting screws 70 so as to maintain the proper tension in the driving belt 62. It will be noted that in the particular construction illustrated, all of the components of the blower assembly 15 are mounted on the blower case 50 so that the entire assembly may be installed in or removed from the lower section or compartment 12 of the housing 10 as a unit in a manner to be described in more detail hereinafter, this construction being an important feature of the invention.

Considering the blower installation in more detail, the lower compartment 12 of the housing 10 in which the blower assembly 15 is removably mounted includes front and rear walls 75 and 76, respectively, side walls 77 and an upper, supporting wall which is provided by the horizontal partition 13 separating the upper and lower housing sections, the elongated opening or slot 19 in the supporting wall 13 extending from the forward edge to the rearward edge thereof as best shown in Fig. 1. The front wall 75 of the housing section 12 is provided with an access opening 80 therein through which the blower assembly 15 may be installed or removed as will be described in detail hereinafter, this access opening being closed by a removable panel or panel member 81 which may be secured to the structure of the housing 10 in a manner to be described.

Considering the manner in which the blower assembly 15 is suspended from the supporting wall 13, the hanger members 51 which support the blower assembly are preferably angle sections, as best shown in Figs. 2 and 5, and are slidable along substantially horizontal track means 85, the track means being connected to the supporting wall 13 and extending substantially from the front wall 75 of the housing compartment 12 to the rear wall 76 thereof so that the blower assembly may be installed in or removed from the housing compartment therefor by merely sliding it along the track means. As best shown in Fig. 5, the track means 85 includes a pair of spaced, parallel track assemblies 86 each of which supports one of the hanger members 51. Each track assembly 86 includes a track supporting member 87 which is preferably a channel section having a pair of spaced, horizontally-extending arms 88 and 89 the upper arm 88 of each channel section being suitably secured to the supporting wall 13 adjacent the respective edges of the slot 19 therein in any suitable manner, as by spot welding, for example.

The lower arms 89 of the track supporting members 87 carry strips of cushioning or shock-absorbing material 92, track members 93, along which the hanger members 51 are slidable, being supported by the cushioning strips 92. In order to secure the cushioning strips to the respective track supporting members 87, these strips are preferably cemented or otherwise secured to the track supporting members and the track members 93 may also be secured to the cushioning strips in a similar manner if desired.

The cushioning strips 92 are preferably formed of rubber or a similar material, for example, and, since they separate the track members 93 from the track supporting members 87 they serve as shock-absorbing means for reducing or substantially eliminating transmission of any vibration of the blower assembly 15 to the structure of the housing 10. Consequently, the track means 85 provides a substantially vibration-free mounting for the blower assembly 15, which is an important feature of the invention.

It will be apparent that the blower assembly 15 may be installed in or removed from the housing section 12 readily by the simple expedient of sliding the blower assembly into or out of this housing section along the track members 93. The principal function of the track members 93, which may be angle sections as best shown in Fig. 5, is to protect the cushioning strips 92 while permitting the hangers 51 to slide freely therealong.

In addition to serving as a shock-absorbing means or cushioning means, the strips 92 also serve to provide a substantially fluid-tight seal between the supporting wall 13 and the blower case 50 along the sides 96 of the outlet opening 58 in the blower case, which is another important feature of the invention. As best shown in Figs. 5 and 6, the cushioning strips 92 extend along the sides 96 of the outlet opening 58 and prevent the escape of air delivered by the blower assembly 15 along the sides 96 of the outlet opening to insure that the air delivered by the blower assembly will flow upwardly into the compartment 11 of the housing 10 through the rearward portion of the slot 19 in the supporting wall 13.

The partial seal of the outlet opening 58 in the blower case 50 provided by the cushioning strips 92 in the manner described is completed by means of sealing elements or strips 99 and 100 along the forward and rearward edges 101 and 102, respectively, of the outlet opening, as best shown in Figs. 4 and 6. The rearward sealing strip 100 is adapted to provide a substantially fluid-tight seal between the blower case 50 and the structure of the housing 10 along the rearward edge 102 of the outlet opening 58 when the blower assembly 15 is in its operating position. As best shown in Fig. 4, when the blower assembly is in its operating position, the rearward sealing strip 100 engages the blower case 50 adjacent the edge 102 of the outlet opening 58 therein and engages the rear wall 76 of the housing section 12 to provide a substantially fluid-tight seal between the blower case and the housing structure. The sealing strip 100 may be cemented or otherwise secured to the rear wall 76 of the housing section 12, or it may be carried by the blower case 50, if desired. In the latter construction the sealing strip 100 may be cemented or otherwise secured to a supporting bracket 103, which may be an angle section as illustrated, and which is suitably secured to the blower case 50 along the rearward edge 102 of the outlet opening 58 therein.

The forward sealing strip 99 is adapted to provide a substantially fluid-tight seal along the forward edge 101 of the outlet opening 58 in blower case 50 with respect to a flange 106 on a removable bulkhead member or retaining member 107 which is adapted to be installed after the blower assembly 15 has been moved into its operating position in the housing section 12. The bulkhead member 107 is adapted to cover the forward portion of the slot 19 in the supporting wall 13 and is also adapted to retain the blower assembly 15 in its operating position as will be described in more detail hereinafter. As previously discussed in connection with the sealing strip 100, the sealing strip 99 may be cemented or otherwise secured to the flange 106 on the bulkhead member 107, or it may be suitably secured to the blower case 50 along the forward edge 101 of the outlet opening 58 therein, as by cementing it to a suitable supporting bracket 108, for example, which is carried by the blower case.

The cushioning strips 92 thus seal the sides 96 of the outlet opening 58 in the blower case 50 with respect to the structure of the housing 10, and the sealing strips 99 and 100 seal the forward and rearward edges 101 and 102, respectively, with respect to the housing structure to provide a substantially continuous, fluid-tight seal along the entire periphery of the outlet opening in the blower case. There may be a slight leakage between the blower case 50 and the housing structure at the corners of the outlet opening 58 in the blower case at the points of intersection of the cushioning strips 92 and the sealing strips 99 and 100, but such leakage will be sufficiently small to be considered negligible.

It will be apparent that when the blower assembly 15 has been moved into its operating position as shown in Fig. 1 by sliding the entire assembly along the track means 85, the outlet opening 58 in the blower case 50 registers with the rearward portion of the slot 19 in the supporting wall 13, as best shown in Fig. 1. As previously mentioned, the bulkhead member 107 is adapted to cover the forward portion of the slot 19 after the blower assembly 15 has been moved into its operating position, the bulkhead member being movable parallel to the direction of movement of the blower assembly 15 along tracks 110 which are provided by portions of the supporting wall 13 along the longitudinal edges of the slot 19 therein. As best shown in Fig. 5, the bulkhead member 107 includes clips 111 which are slidable relative to the upper arm 88 of the track supporting members 87 and which removably secure the bulkhead member to the supporting partition 13. Thus, the bulkhead member 107 may be moved into its operating position as shown in Fig. 1 after the blower assembly 15 has been moved into its operating position by sliding the bulkhead member along the tracks 110 until the forward sealing strip 99 engages both the blower case 50 along the forward edge 101 of the outlet opening 58 therein and the flange 106 on the bulkhead member, thereby completing the seal of the blower case with respect to the housing structure and covering the forward portion of the slot 19 in the supporting wall 13. If desired, the bulkhead member 107 may be provided with a projecting flange 112 thereon which may be secured to the wall 24 of the housing 10 by means of screws, or the like, to retain the bulkhead member in its operating position. Securing the bulkhead member 107 to the housing structure serves to retain the entire blower assembly 15 in its proper operating position since the blower assembly cannot be removed from the housing compartment 12 until the bulkhead member has been removed, which is still another important feature of the invention.

The bulkhead member 107, when in its operating position, serves to secure the access panels 27 and 81 which enclose the access openings in the front walls of the upper and lower housing sections 11 and 12, respectively. As best shown in Fig. 3, the panel 81 is provided with a clip 116 thereon adjacent its lower edge which is adapted to be hooked over a portion 117 of the front wall 75 of the housing section 12 adjacent the lower edge of the access opening 80 therein. The upper edge of the panel 81 is bent to provide a pair of hook-like portions 118 and 119 which are respectively adapted for locked engagement with a flange 120 on the bulkhead member 107 and with the lower edge 121 of the panel 27 which covers the access opening in the upper housing compartment 11. The lower edge 121 of the access panel 27 is preferably curved inwardly as shown in Figs. 1 and 3 so as to provide a continuous front wall for the entire installation when the panels 27 and 81 are in position.

It will be apparent that after the bulkhead member 107 has been moved into its operating position by sliding it along the tracks 110 therefor, the panel 81 may be placed in its proper position by placing the clip 116 at the lower edge thereof over the portion 117 of the wall 75, as shown in phantom in Fig. 3, and by subsequently placing the hooked portion 118 at the upper end of the panel 81 over the flange 120 on the bulkhead member. Thereafter, the panel member 27 may be placed in its proper position by inserting the curved lower edge 121 thereof into the hooked portion 119 at the upper end of the panel 81, the panel 27 being secured to the housing 10 in any suitable manner not specifically shown in the drawings. Thus, the panel 27 assists in securing the panel 81 to the housing 10 and the two panels are retained by the bulkhead member 107.

Considering the operation of my blower mounting system, it will be apparent that the entire blower assembly 15 may be removed from the lower housing section 12 readily by merely removing the access panels 27 and 81 and the bulkhead member 107, pulling the plug 66 from its receptacle 67, and subsequently sliding the entire blower assembly out of the housing along the track means 85. Thus, the entire blower assembly 15 may be removed from the housing 10 readily whenever desired to make all components of the assembly fully accessible in the event that repairs or adjustments thereof are required. When re-installing the blower assembly 15, it is merely necessary to slide the assembly into the housing section 12 again along the track means 85 which guide the blower assembly into its operating position. Upon re-installing the bulkhead member 107, and securing it in its operating position in either of the manners described, the blower assembly 15 is automatically secured in its operating position and the outlet opening 58 in the blower case 50 is automatically sealed with respect to the structure of the housing 10 through the cooperation of the cushioning strips 92 and the sealing strips 99 and 100. It will thus be apparent that the entire blower assembly 15 may be installed and/or removed readily with a minimum expenditure of time and effort and is automatically sealed with respect to the housing structure upon installation thereof, no separate sealing operations being required.

It will also be apparent that if inspection, maintenance (such as lubrication, for example), or minor adjustments of any of the components of the blower assembly 15 are required, such operations may be performed readily by simply removing the access panel 81. If desired, the bulkhead member 107 may be removed readily for convenience in performing such operations without removing the blower assembly 15 from the housing.

Suspending the blower assembly 15 from the supporting wall 13 by means of the track assemblies 86 in the manner described provides a simple and reliable mounting system for the blower assembly which avoids any necessity for supplementary supporting means such as legs or the like. In addition, the strips 92 of cushioning material provide a shock-absorbing mounting for the blower assembly 15 which provides a substantially vibration-free heater installation by reducing or substantially eliminating any transmission of vibration from the blower assembly to the structure of the housing 10. Although I have disclosed an exemplary embodiment of my invention and have described a specific application thereof, I do not desire to be limited thereto since various changes, modifications and substitutions may be incorporated in the embodiment disclosed and since the invention is susceptible to other applications, both without departing from the spirit of the invention. Consequently, I do not desire to be limited to the specific disclosures contained herein, except insofar as may be required by the appended claims.

I claim as my invention:

1. In a blower installation, the combination of: supporting structure including a pair of spaced, parallel, track supporting members; a track member supported by each of said track supporting members; cushioning material separating said track members from the respective track supporting members; and a blower case supported by and movable along said track members.

2. In a blower installation, track means for movably supporting a blower case, comprising: a track member; a supporting member for said track member; and cushioning material between and separating said track member and said supporting member.

3. In a blower installation, the combination of: a movable blower case; means for guiding said blower case into and out of an operating position along a predetermined path; a movable bulkhead member; means for guiding said bulkhead member into and out of an operating position along a predetermined path which is substantially parallel to said first-mentioned path; and means operative when said blower case and said bulkhead member are in their respective operating positions for providing a substantially fluid-tight seal between said case and said member.

4. In a blower installation, the combination of: supporting structure including a wall having a slot therein; first and second track means carried by said supporting structure and extending substantially parallel to said slot; a blower case movable along said first track means and having an outlet opening therein which is adapted to register with a portion of said slot; and a bulkhead member movable along said second track means and adapted to cover another portion of said slot.

5. In a blower installation, the combination of: a housing having intersecting first and second walls, said first wall having an opening therein; first and second track means carried by said housing and extending substantially parallel to said first wall of said housing toward said second wall thereof; a blower case having an outlet opening therein which is adapted to register with said opening in said first wall of said housing, said blower case being movable along said first track means into and out of an operating position wherein said openings are in registry; means associated with said first track means for providing a substantially fluid-tight seal between said blower case and said first wall of said housing adjacent a pair of spaced peripheral portions of said outlet opening; means disposed between said blower case and said second wall of said housing and operative when said blower case in in its operating position for providing a substantially fluid-tight seal between said blower case and said second wall adjacent a third peripheral portion of said outlet opening intermediate said spaced peripheral portions thereof; a bulkhead member movable along said second track means into and out of an operating position; and means disposed between said blower case and said bulkhead member and operative when said blower case and said bulkhead member are in their respective operating positions for providing a substantially fluid-tight seal between said blower case and said bulkhead member adjacent a fourth peripheral portion of said outlet opening intermediate said spaced peripheral portions and opposite said third peripheral portion thereof.

6. In apparatus of the character described, the combination of: a housing adapted to receive a blower assembly therein and including intersecting first and second walls each having an opening therein; a removable bulkhead member adapted to cover said opening in said first wall; a removable panel member adapted to cover said opening in said second wall; and means at opposite ends of said panel member adapted for locked engagement with said housing and said bulkhead member, respectively, for removably securing said panel member to said housing.

7. In a heating installation, the combination of: a housing including a first section which is adapted to receive a heating unit therein and which is provided with a removable panel member, and including a second section which is adapted to receive a blower assembly therein and which is provided with a removable panel member adjacent said panel member of said first housing section; locking means on said panel member of said second housing section and adapted for locked engagement with said second housing section; and additional locking means on said panel member of said first housing section and adapted for locked engagement with said panel member of said second housing section.

8. In a blower installation, the combination of: supporting structure; first and second track means carried by said supporting structure; a blower case movable along said first track means into and out of an operating position; and removable means movable along said second track means for retaining said blower case in its operating position.

9. In a blower installation, the combination of: structure means having an opening therein; a blower case carried by said structure means and movable relative thereto into an operating position, said blower case being provided with an outlet opening therein which is adapted to register with a portion of said opening in said structure means when said blower case is in its operating position; and closure means carried by and movable relative to said structure means into an operating position adjacent said blower case when the latter is in its operating position for closing that portion of said opening in said structure means which is not in registry with said outlet openings.

10. A blower installation as set forth in claim 9 including sealing means operative when said blower case and said closure means are in their respective operating positions for providing a substantially fluid-tight seal between said blower case and said closure and structure means adjacent the periphery of said outlet opening.

11. A blower installation as set forth in claim 10 wherein said sealing means comprises cushioning means isolating said blower case from said closure and structure means for reducing transmission of vibration from said blower case to said structure means.

12. A blower installation as set forth in claim 9 wherein said blower case and said closure means are carried by and movable relative to said structure means along track means on said structure means.

13. In a blower installation, track means for movably supporting a blower case, comprising: a substantially horizontal, track supporting member; a strip of cushioning material extending lengthwise of and carried by said track supporting member; and a track member extending lengthwise of and carried by said strip of cushioning material, said track member being completely isolated from said track supporting member by said strip of cushioning material to minimize transmission of vibration from said track member to said track supporting member.

JOHN H. WESSEL.

REFERENCES CITED

The following references are of record in the file of this patent:

UNITED STATES PATENTS

| Number | Name | Date |
| --- | --- | --- |
| 1,404,598 | Gits | Jan. 24, 1922 |
| 1,610,774 | Hanson | Dec. 14, 1926 |
| 2,089,969 | Kuenhold | Aug. 17, 1937 |